United States Patent Office 3,432,538
Patented Mar. 11, 1969

3,432,538
METHOD FOR PREPARATION OF CYCLIC DIORGANOSILOXANES
James W. Curry, Dallas, Tex., assignor to Texas Instruments Incorporated, Dallas, Tex., a corporation of Delaware
No Drawing. Filed July 1, 1966, Ser. No. 562,094
U.S. Cl. 260—448.2
Int. Cl. C07d 103/02; C07f 7/08
4 Claims

ABSTRACT OF THE DISCLOSURE

This specification discloses a method of preparing cyclic diorganosiloxanes characterized by reacting, at ambient temperature and without heating, tertiary butyl alcohol and dimethyl dichlorosilane. The resulting cyclic diorganosiloxanes are purified by distillation. Other tertiary alcohols and other diorganodihalosilanes are disclosed.

---

This invention relates to a method for the preparation of cyclic diorganosiloxanes, and more particularly to a method of preparing cyclic diorganosiloxanes by reaction of a tertiary alcohol with a diorganodihalosilane.

Cyclic diorganosiloxanes have been prepared commercially by hydrolyzing a diorganodihalosilane such as dimethyldichlorosilane. Yields of distillable material by this method have been relatively low, but can be improved by subjecting the crude dimethylsiloxane hydrolysate to vacuum heating in the presence of a small amount of strong alkali such as potassium hydroxide. The latter procedure has two disadvantages, namely, the introduction of another step into the process and the danger of some cross-linking and gelation caused by alkaline cleavage of organic groups from silicon.

With the present invention, relatively high yields of distillable cyclic diorganosiloxanes are obtainable with relatively few steps. The invention may be generally described as the reaction of a tertiary alcohol with a diorganodihalosilane to obtain a mixture of cyclic diorganosiloxanes.

It is known that a chlorosilane may be reacted with a tertiary alcohol, and the following reaction:

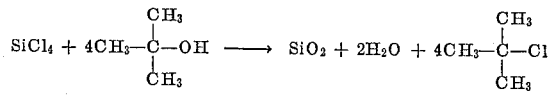

is taught by Ridge and Todd, "Journal of the Chemical Society," p. 2637 (1949).

It has also been revealed by Boyce and West, "Journal of Organic Chemistry," vol. 16, p. 391 (1950) that the following reaction may be effected:

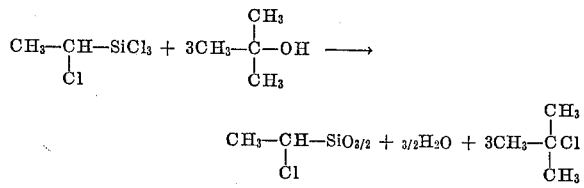

In each of the above reactions, the silicon-containing materials are polymeric and are probably hydrated to some extent due to the water which is also formed in the reaction.

From the above reactions it would be expected that the reaction of a diorganodichlorosilane with a tertiary alcohol would produce a hydroxy end-blocked, linear siloxane polymer, but the present invention reveals that the reaction may be used to produce cyclic diorganosiloxanes as will be more clearly understood by reference to the following examples.

EXAMPLE 1

To a separatory funnel maintained at ambient temperature and vented to the atmosphere through a condenser was added 370 grams (5.00 moles) of tert-butyl alcohol. Dimethyldichlorosilane, 65.3 grams (0.506 mole) was added through an addition funnel over a two hour period to the tert-butyl alcohol, and when the addition was completed, the mixture was moderately stirred for 16.5 hours.

The mixture was removed from the separatory funnel and placed in a pot to which a distillation column was attached. The column was connected through a condenser to a flask receiver maintained at ambient temperature, and the flask was vented to the atmosphere through a trap vessel maintained in an acetone and Dry Ice (solid $CO_2$) bath. The condenser was jacketed and the water flowing through the jacket was maintained at ambient temperature.

The temperature of the mixture in the pot was raised to 67° C. to obtain 131.5 grams of tert-butyl chloride and tert-butyl alcohol distillate, the pressure of the distillation being maintained at atmospheric (754.2 mm. Hg). The pot temperature was raised to 133° C. resulting in a maximum head temperature in the distillation column of 83° C., at which temperature 236.0 grams of additional tert-butyl chloride and tert-butyl alcohol was obtained as distillate.

By use of conventional vacuum equipment, the pressure of distillation was reduced to 0.03 mm. Hg and the pot temperature raised to 62° C. at which temperature 6.8 grams of distillate having a refractive index of 1.3959 was obtained in the flask and 10.8 grams of distillate having a refractive index of 1.3947 was obtained in the Dry Ice (solid $CO_2$) and acetone trap.

The 12.6 grams of residue left in the pot had a refractive index of 1.4044.

The 12.6 grams of residue was further heated at a pot temperature between 53° C. and 77° C. under a pressure of 0.03 mm. Hg to obtain 2 grams of distillate having a refractive index of 1.3997 leaving a final residue of 9.5 grams in the pot with a refractive index of 1.4054, and the results of the vacuum distillation are tabulated below.

| Distillate, grams: | Refractive index (25° C.) |
|---|---|
| 6.8 | 1.3959 |
| 10.8 | 1.3947 |
| 2.0 | 1.3997 |
| 9.5 | 1.4054 |

The refractive index of the various cyclic dimethylsiloxanes, as reported by Hunter et al., "Journal of the American Chemical Society," vol. 68 p. 667 (1946) are as follows.

| Cyclic: | Refractive index (25° C.) |
|---|---|
| Tetramer | 1.3935 |
| Pentamer | 1.3958 |
| Hexamer | 1.3996 |
| Heptamer | 1.4018 |
| Octamer | 1.4039 |

The theoretical yield of cyclic dimethylsiloxanes $[(CH_3)_2SiO_2]_x$, where $x \geq 4$, from the above reaction would be 37.0 grams. The total weight of distillate having a refractive index corresponding to those listed above having been 30.2 grams, the yield of dimethylsiloxane is found to be 81.6 percent.

EXAMPLE 2

The same equipment described in Example 1 was used, and to the separatory funnel was added 333.5 grams (4.50 moles) of tert-butyl alcohol and 1000 ml. of toluene. Over a 6.25 hour period 181.9 grams (1.41 moles) of dimethyldichlorosilane was added to the tert-butyl alcohol and toluene mixture which was vigorously agitated throughout the addition and for one-quarter hour after the addition of dimethyldichlorosilane was complete.

The material in the separatory funnel was removed to the distillation pot. The toluene, tert-butyl chloride, water and any unreacted tert-butyl alcohol was distilled from the pot by raising the temperature of the pot to 110° C. and maintaining the pressure of distillation at atmosphere (754.3 mm. Hg). The temperature of the pot was reduced to 96.5° C. and the pressure dropped to 22 mm. Hg until a residue of 102.5 grams remained in the pot.

The residue was fractionally distilled and the results are tabulated below:

| Fraction | Boiling point of distillate (° C.) | Pressure of distillation (mm. Hg.) | Pot temperature (° C.) |
|---|---|---|---|
| 1 | 79.5 | 21 | 96 |
| 2 | 83–91.5 | 21–20.5 | 96–122.5 |
| 3 | 30–36 | 0.17–0.015 | 49–60.5 |
| 4 | 32–49.5 | 0.025–0.02 | 64–75.5 |
| 5 | 49.5–52 | .02–.04 | 75.5–102 |
| 6 | 60–73.5 | 0.070–0.035 | 107.5–151 |
| 7 | 74–132 | 0.025–0.035 | 104–169 |

| Fraction | Weight of distillate (grams) | Refractive index (25° C.) |
|---|---|---|
| 1 | 1.6 | 1.4146 |
| 2 | 56.9 | 1.3946 |
| 3 | 17.4 | 1.3961 |
| 4 | 2.0 | 1.3981 |
| 5 | 4.7 | 1.3998 |
| 6 | 3.1 | 1.4002 |
| 7 | 4.0 | 1.4042 |

There was collected in the Dry Ice (solid $CO_2$) and acetone trap an additional 2.1 grams of distillate (refractive index 1.3953 at 25° C.). There was collected in a second Dry Ice (solid $CO_2$) and acetone trap an additional 0.2 gram of distillate (refractive index of 1.3986 at 25° C.).

The residue left in the pot, after filtration, was a clear yellow liquid weighing 6.2 grams having a refractive index of 1.4055 at 25° C.

The theoretical yield of mixed cyclic dimethylsiloxanes from the above reaction was calculated to be 104.5 grams. The actual yield of 96.6 grams represents an actual yield of 92.4 percent of the theoretical yield.

EXAMPLE 3

The same equipment was used as described in Example 1. A quantity of 222.4 grams (3.00 moles) of tert-butyl alcohol was mixed in the separatory funnel with 1000 ml. of toluene. There was dripped into the mixture 193.6 grams (1.50 moles) of dimethyldichlorosilane over a 4.5 hour period. The solution was stirred during the addition of dimethyldichlorosilane and for 0.5 hour thereafter. The solution was allowed to stand for approximately one hour during which time an aqueous layer formed. The aqueous layer (31.2 grams) was separated and the toluene layer was removed and distilled. There was obtained a residue of crude, mixed cyclic dimethylsiloxanes in a yield of 99 percent of the theoretical.

In the above reactions, various tertiary alcohols may be used, although tert-butyl alcohol is preferred. For example, 3-methyl-3-pentanol, 2,3-dimethyl-2-butanol, 2-methyl-2-pentanol, tert-amyl alcohol, tert-butyl alcohol, 2-methyl-3-buten-2-ol, and triphenylcarbinol may be used, as well as any of the tertiary alcohols having a lower alkyl, lower alkenyl, lower alkynyl, or lower aryl radicals attached to the C—OH group.

In addition to dimethyldichlorosilane, other diorganodihalosilanes such as diethyldichlorosilane, methyl (phenyl) dichlorosilane, divinyldichlorosilane, methylvinyldichlorosilane, diethynyldichlorosilane, dipropargyldichlorosilane, (dichlorophenyl) methyldichlorosilane, di-alpha-naphthyldichlorosilane, diphenyldichlorosilane, and other diorganosilanes having lower alkyl, lower alkenyl, lower alkynyl, or lower aryl radicals attached to the silane molecule may be used.

Further, while the reaction is preferably carried out in toluene, any suitable non-reactive solvent may be used, such as benzene, pentane, hexane, cyclohexane or diethyl ether.

Each of the diorganosiloxanes is an immediate precursor of high molecular weight polydimethylsiloxanes used in the manufacture of silicone based lubricants, dielectric fluids, rubber, and the like.

While rather specific terms have been used in describing various embodiments of the method, they are not intended, nor should they be construed, as a limitation on the invention as defined by the claims.

What is claimed is:

1. A process of preparing cyclic dimethylsiloxanes comprising the steps of reacting tertiary butyl alcohol with dimethyldichlorosilane at substantially ambient temperature and at atmospheric pressure.

2. The process of claim 1 wherein said reaction is carried out between 20° C. and 30° C. and at atmospheric pressure.

3. The process of claim 1 wherein the reaction is carried out in a solution of an unreactive organic solvent.

4. The process of claim 1, wherein said cyclic dimethylsiloxanes are purified by distillation of reaction products and reactants therefrom at elevated temperature.

References Cited

UNITED STATES PATENTS

| 2,716,128 | 8/1955 | West. |
| 2,832,794 | 4/1958 | Gordon. |
| 2,947,772 | 8/1960 | Eynon et al. ____ 260—448.2 X |
| 3,358,009 | 12/1967 | Omietanski et al. |
| 3,274,288 | 9/1966 | Harris et al. ____ 260—448.2 X |
| 3,223,474 | 12/1965 | Nitzsche et al. ___ 260—448.2 X |
| 3,360,538 | 12/1967 | Ashby. |

TOBIAS E. LEVOW, *Primary Examiner.*

PAUL F. SHAVER, *Assistant Examiner.*